United States Patent [19]

Haddad et al.

[11] 4,404,095

[45] Sep. 13, 1983

[54] METHOD AND MEANS FOR SEPARATING GASEOUS MATERIALS FROM FINELY DIVIDED CATALYST PARTICLES

[75] Inventors: James H. Haddad, Princeton Junction; Frederick J. Krambeck, Cherry Hill, both of N.J.

[73] Assignee: Mobil Oil Corporation, New York, N.Y.

[21] Appl. No.: 400,843

[22] Filed: Jul. 22, 1982

[51] Int. Cl.³ .................. C10G 11/18; F27B 1/20
[52] U.S. Cl. .................... 208/161; 208/153; 208/164; 422/144
[58] Field of Search ............. 208/164, 161, 153; 422/144

[56] References Cited

U.S. PATENT DOCUMENTS 4,043,899  8/1977  Anderson et al. ............... 208/161
4,219,407  8/1980  Haddad et al. ............... 208/161 X

*Primary Examiner*—Delbert E. Gantz
*Assistant Examiner*—Lance Johnson
*Attorney, Agent, or Firm*—Charles A. Huggett; Charles J. Speciale; L. G. Wise

[57] ABSTRACT

A suspension of catalyst and gasiform material is separated by a catalyst particle concentrating means which discharges the catalyst into a steam stripping zone and transmits the separated gasiform material to a cyclone separator by means of a restricted passageway which minimizes the time the gasiform material is exposed to the catalytic reaction product temperature.

21 Claims, 3 Drawing Figures

METHOD AND MEANS FOR SEPARATING GASEOUS MATERIALS FROM FINELY DIVIDED CATALYST PARTICLES

BACKGROUND OF THE INVENTION

1. Field of the Invention

This invention relates to improving the separation of the catalyst phase from the gasiform phase in a catalytic cracking unit. More particularly, it relates to improvements in separating the catalyst phase from the gasiform phase as the suspension containing them discharges from a riser outlet. This invention especially relates to improving the separation of the gasiform product phase from the catalyst at the time the desired chemical reaction has been accomplished in the presence of the catalyst.

2. Description of the Prior Art

The field of catalytic cracking, particularly fluid catalyst operations, has undergone significant development improvements due primarily to advances in catalyst technology and product distribution obtained therefrom. With the advent of high activity catalysts and particularly crystalline zeolite cracking catalysts, new areas of operating technology have been encountered requiring even further refinements in processing techniques to take advantage of the high catalyst activity, selectivity and operating sensitivity.

Of particular concern in this field has been the development of methods and systems for separating gasiform products from fluidizable catalyst particles, particularly from a high activity crystalline zeolite cracking catalyst, under more efficient separating conditions so as to reduce the overcracking of conversion products and promote the recovery of desired products of a hydrocarbon conversion operation. However, present day cyclonic equipment often permits an undesired extended contact between the product phase and the catalyst phase of a portion of the suspension discharged. This extended contact has been found to contribute to a loss in desired product amounting up to about 10 percent. Thus, it has been determined that the gasoline yield loss due to overcracking can be in the range of 0.15 to about 1.5 volume percent based on fresh feed. Recent developments in this art have been concerned with the separation and recovery of entrained catalyst particles from gasiform products in a short contact time riser hydrocarbon conversion operation.

The hydrocarbon conversion catalyst employed is preferably a high activity crystalline zeolite catalyst of fluidizable particle size which is transferred in suspended or dispersed phase condition generally upwardly through one or more riser conversion zones providing a hydrocarbon residence time in each conversion zone in the range of 0.5 to about 10 seconds and more usually less than about 8 seconds. High temperature riser hydrocarbon conversions of at least 1000° F. at 0.5 to 4 seconds hydrocarbon residence time in contact with the catalyst in the riser is desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the catalyst conversion step. The entrained hydrocarbons are subjected to further contact with the catalyst until removed from the catalyst by mechanical means and/or stripping gas in a separated catalyst stripping zone. Hydrocarbon conversion products separated from the catalyst and stripped materials are combined and passed to a product fractionation step. Stripped catalyst containing deactivating amounts of carbonaceous material hereinafter referred to as coke is then passed to a catalyst regeneration operation.

Various processes and mechanical means have been employed heretofore to effect separation of the catalyst phase from the hydrocarbon phase at the termination of the riser cracking zone.

U.S. Pat. No. 4,043,899 of Anderson, et al. disclosed a method for rapid separation of a product suspension comprising fluidized catalyst particles and the vaporous hydrocarbon product phase by discharging the entire suspension directly from the riser conversion zone into a cyclonic separation zone which provides cyclonic stripping of the catalyst after it is separated from the hydrocarbon vapors. In the method of Anderson, et al. the cyclone separator is modified to include an additional downwardly extending section comprising a lower cyclone stage. In this arrangement, catalyst separated from the gasiform material in the upper stage slides down a downwardly sloping baffle to the lower cyclone where stripping steam is introduced to further separate entrained hydrocarbon product from the catalyst recovered from the upper cyclone. The steam and the stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg. This process requires that the entire volume of catalyst, gasiform phase and stripping steam pass through the cyclone separator which means that this equipment must be designed to efficiently handle not only a large vapor volume but also a large quantity of solid particles.

U.S. Pat. No. 4,070,159 of Myers et al. provides a separation means whereby the bulk of the solids is discharged directly into the settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from but near the discharge end of the riser conversion zone. A deflector cone mounted directly above the terminus of the riser causes the catalyst to be directed in a downward path so as to prevent the catalyst from abrading the upper end of the disengaging vessel. The cyclone separator is of the usual configuration employed in a catalytic cracking unit to separate entrained catalyst particles from the cracking hydrocarbon products so that the catalyst passes through the dipleg of the cyclone to the body of the catalyst in the lower section of the disengaging vessel and the vaporous phase is directed from this vessel to a conventional fractionation unit. There is essentially no net flow of gases with the disengaging vessel beyond that resulting from a moderate amount of steam introduced to strip the catalyst residing in the bottom of the disengaging vessel.

U.S. Pat. No. 4,219,407 of Haddad et al. discloses the separation of the catalyst from the gasiform cracked products in a fashion which permits effective steam stripping of the catalyst. The suspension of catalyst and gasiform material is discharged from the riser conversion zone outwardly through radial extending passageways which terminate in a downward direction. Catalyst stripping zones are located beneath the terminus of each of the radial extending passageways. Each stripper consists of a vertical chamber open at the top and the bottom with downwardly sloping baffles located within the chamber so as to cause the catalyst to flow in a discontinuous manner countercurrent to upwardly flowing stripping steam introduced at the lower end of the stripping chamber. The radial extending arms are provided with a curved inner surface and confining sidewalls to impart a cyclonic concentration of catalyst particles promoting a forced separation from the hydrocarbon vapors discharged as a suspension from the riser. This separation of the catalyst from the vapors is basically achieved through rapid changes in direction of the several phases. Thus the cyclonic collection and concentration of catalyst particles is used to reverse the flow of separated catalyst such that it is concentrated as a downwardly confined stream which discharges generally downwardly and into the open upper end of the catalyst stripping chamber. A vapor disengaging space is provided between the discharge end of the radial extending arms and the top of the catalyst strippers to promote the rapid removal of separated vapors from out of contact with discharged catalyst. The separated vapors pass upwardly through the disengaging vessel to the open inlet of a cyclone separator which removes entrained catalyst from the gasiform material for return through a dipleg to the body of steam stripped catalyst while the separated vaporous material passes to a fractionation unit. The hydrocarbon product, as it passes within the disengaging vessel from the discharge of the radial extending arms to the cyclone separator, travels in a random fashion and is exposed to catalytic reaction temperatures which cause undesirable side reactions and thermal cracking before these vapors enter a quench zone in the main fractionator of the fluid cracking unit.

It is an object of this invention to provide a process and an efficient means for separating cracking catalyst from gasiform material.

It is another object of this invention to provide a process and an apparatus which will separate cracking catalyst and gasiform material in a manner which is an improvement over the presently available processes and apparatus, particularly the process disclosed in U.S. Pat. No. 4,219,407.

It is a further object of this invention to provide a process and an apparatus for separating cracking catalyst and gasiform material whereby the length of time the gasiform material is subjected to high temperature after separation from the bulk of the catalyst is minimized so as to reduce overcracking and thermal cracking of the cracked products.

SUMMARY OF THE INVENTION

In accordance with the present invention these and other objects are achieved by providing improvements to the process and means of U.S. Pat. No. 4,219,407. More particularly, it has been found that by minimizing the length of time the cracked mineral oil vapors are exposed to the catalytic reaction product temperature after being separated from the catalyst, overcracking and thermal cracking of these vapors is significantly reduced.

The process of this invention is described as an improvement in a process for the fluid catalytic cracking of mineral oil whereby the mineral oil is catalytically cracked by passing a suspension of mineral oil and catalyst through a riser conversion zone under cracking conditions into a disengaging vessel and the catalyst recovered from said riser conversion zone is thereafter regenerated to remove carbonaceous deposits before return of the regenerated catalyst to said riser conversion zone and whereby the mineral oil-catalyst suspension is separated upon discharge from the riser conversion zone by (a) discharging the suspension outwardly through an opening in the upper periphery of the riser and through a radially extending restricted passageway having an opening in the bottom side thereof whereby a substantially confined catalyst stream discharges in a downward direction generally separate from the cracked mineral oil vapors, said restricted passageway curved downwardly adjacent the outer end thereof to induce a downward movement on said confined catalyst stream in said passageway sufficient to direct said stream downwardly into the open upper end of a catalyst stripping passageway positioned beneath said outer end to maintain catalyst so collected and directed separate from said discharged cracked mineral oil vapors and (b) passing the cracking mineral oil vapors through the disengaging vessel to the upper portion thereof and into the entrance of a cyclone separation means, said improvement comprising: discharging the cracked mineral oil vapors from the outer extremity of the radially extending restricted passageway to a vertically disposed restricted passageway in fluid communication with the inlet of a first cyclone separation means whereaby the cracked mineral oil vapors are directed from the outer extremity of the radially extending restricted passageway into the first cyclone separation means.

This invention is also directed to an apparatus for separation of catalyst particles from gasiform material which comprises:

(a) a disengaging vessel serving as a reservoir for collected catalyst particles, (b) a vertically disposed elongated tubular conduit having an upstream end and a downstream end, the latter terminating within said vessel, (c) a radially extending restricted passageway having an inlet communicating with said elonguated tubular conduit at said downstream end and an opening along the bottom of said radially extending restricted passageway, said bottom opening adapted to discharge catalyst particles in a downward direction as a substantially confined catalyst stream, (d) a first cyclone separation means adapted to separate entrained catalyst from gasiform material, to discharge separated catalyst into said disengaging vessel and to discharge said gasiform material external to said disengaging vessel, (e) a vertically disposed catalyst stripping passageway positioned below and in open communication with the bottom opening of the radially extending restricted passageway and adapted to receive the substantially confined catalyst stream into its upper end, and (f) a vertically disposed restricted passageway in direct fluid communication with the upper end of the catalyst stripping passageway and the inlet of the first cyclone separation means and in open fluid communication with the bottom opening of the radially extending elongated restricted passageway, said vertically disposed restricted passageway, surrounding and containing said radially extending restricted passageway in spaced relationship thereto.

In another embodiment this invention is directed to an apparatus for separation of catalyst particles from gasiform material which comprises:

(a) a disengaging vessel serving as a reservoir for collected catalyst particles, (b) a vertically disposed elonguated tubular conduit having an upstream end and a downstream end, the latter terminating within said vessel, (c) a radially extending restricted passageway having an inlet communicating with said elonguated tubular conduit at said downstream end, an opening along the bottom of said radially extending restricted passageway and an opening on the top of the downstream extremity of said radially extending elongated restricted passageway, said bottom opening adapted to discharge catalyst particles in a downward direction as a substantially confined catalyst stream into the interior of said disengaging vessel, (d) a first cyclone separation means adapted to separate entrained catalyst from gasiform material, to discharge separated catalyst into said disengaging vessel and to discharge said gasiform material external to said disengaging vessel, and (e) a vertically disposed restricted passageway communicating with the top opening of said downstream extremity of the radially extending restricted passageway and the inlet of said first cyclone separation means,

DESCRIPTION OF THE PREFERRED EMBODIMENTS

Figure 1:
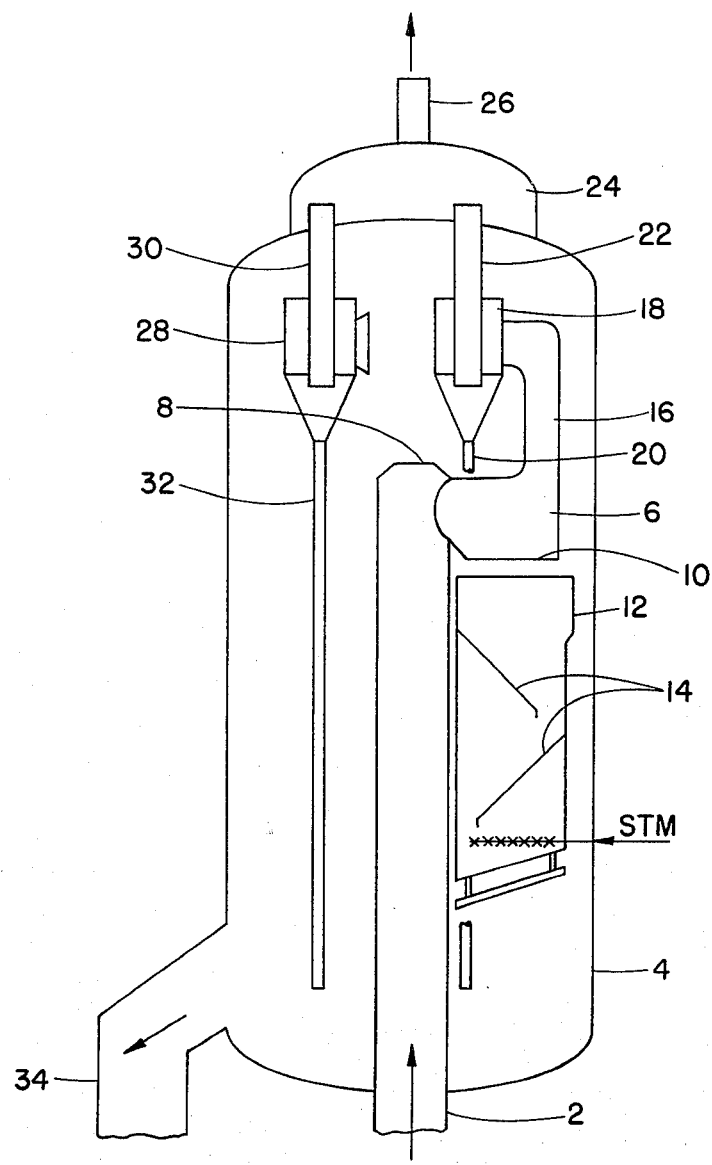
FIG. 1 is a drawing of one embodiment of the invention.

The present invention relates to improvements in a process and an apparatus to separate catalyst particles in gasiform material, particularly in a fluid catalytic cracking unit. This invention is an improvement over the invention disclosed and claimed in U.S. Pat. No. 4,219,407, the entire contents of which are incorporated herein by reference.

As disclosed in said patent, the separation of catalyst particles from gasiform material which is the subject of this invention is particularly practiced in a hydrocarbon conversion process such as catalytic cracking which comprises a catalytic hydrocarbon conversion operation and a catalyst regeneration operation. In the hydrocarbon conversion portion of this combination operation, it is desired to employ a high activity crystalline zeolite conversion catalyst such as a faujasite "Y" zeolite containing cracking catalyst. The hydrocarbon conversion operation is preferably a dispersed catalyst phase riser conversion operation of limited or restricted hydrocarbon contact time between catalyst and hydrocaraobn reactant selected to particularly promote the formation of desired products including gasoline boiling range materials as well as lighter and higher boiling product materials. Thus it is contemplated practicing the conversion of gas oil feeds and higher boiling hydrocarbon materials in a single riser reactor employing temperatures in excess of 900° F. and as high as 1050° or 1100° F. In such hydrocarbon conversion operations, the catalyst-hydrocarbon residence time in a riser reaction zone is usually restricted to less than 15 seconds and is desirably restricted depending on reaction temperature and feed composition to within the range of 0.5 to about 8 seconds hydrocarbon residence time. For the high temperature operations it is preferred to restrict the hydrocarbon residence time in contact with catalyst within the range of 0.5 to 4 seconds and to minimize overcracking of desired products by effecting a rapid separation of the suspension substantially immediately upon discharge from the riser conversion zone. Thus an important aspect of this invention is concerned particularly with an apparatus modification and operating technique or method for obtaining a rapid separation of a hydrocarbon/catalyst suspension discharged from a high temprature riser cracking zone.

The present invention is concerned with separating a suspension discharged from a riser contact zone under conditions restrictively collecting the catalyst particles in a zone separate from discharged gasiform material and altering the flow direction of the collected catalyst particle to flow out of contact with gasiform material as a downwardly confined stream. The collected and confined catalyst particles stream thus separated, as for example from hydrocarbon products of catalytic conversion, are discharged into an open ended restricted downflow passageway, disclosed in U.S. Pat. No. 4,217,407, wherein the catalyst particles are maintained out of contact with hydrocarbon vapors. The downflow collected catalyst passageway referred to as a catalyst stripping zone is positioned beneath the catalyst separation and collection means so that the separated and confined catalyst stream is maintained out of further contact with discharged hydrocarbon conversion vapors. As the catalyst flows through the stripping zone it cascades over downwardly sloping baffles so as to contact upwardly flowing steam which removes hydrocarbons from the surface of the catalyst particles and from the interstitial space between the particles. In the prior art process the hydrocarbon vapors pass from the radially extending arms together with the catalyst but move out from under the open discharge of the arms into a lower velocity region and into the upper portion of the disengaging vessel at reduced gas velocity. The separted vapors then pass into the inlet of cyclone separating equipment positioned in the upper part of the disengaging vessel.

In one embodiment of the present invention, a conduit is provided at the end of the radial extending arm communicating with the upper portion of the arm and the inlet of the cyclone separating means. In this fashion the gasiform material has a means to be passed directly to the cyclone separators at a significantly higher velocity than in the prior art process. Thus, it is possible to expose this gasiform material to cracking temperatures for a shorter period of time than in the prior art. The temperatures of the gasiform material may be reduced or quenched by providing cooling means in the gasiform conduit or by merely passing it in rapid fashion for quenching in the base of the main fractionator of the fluid catalytic cracking unit.

This embodiment for practicing the improvements of this invention is showed diagrammatically in FIG. 1 which presents an arrangement of apparatus for effecting separation of a suspension discharged from a riser conversion zone into a disengaging vessel.

Referring to FIG. 1, there is shown the upper end of riser hydrocarbon conversion zone 2 extending upwardly into disengaging vessel 4. The riser terminates in an upper intermediate portion of vessel 4 with a horizontal cross member arm referred to as radial extending restricted passageway 6. For illustrative purposes, only one radial extending restricted passageway is shown but those skilled in the art will appreciate that normally 2, 3, 4 or more of these radial passageways extending generally horizontally outward from the upper capped end 8 of riser 2 will be provided, as the need dictates. The bottom side of radial passageway 6 is in open communication with the interior of vessel 4. This opening points in the downward direction. Positioned below opening 10 is catalyst collecting and stripping vessel 12 provided with a plurality of downward sloping baffles 14 to allow stripping steam, which enters at the lower end of vessel 12, to intimately contact downwardly cascading catalyst. Vessel 12 has an upper open end enlarged to provide a funnel shaped collecting zone for the catalyst discharged from radial passageway 6. The bottom end of vessel 12 is also open-ended to permit the stripped catalyst to pass to the body of stripped catalyst collected in the lower end of vessel 4.

The upper end of radial passageway 6 is in direct fluid communication with restricted passageway 16 which in turn is in direct fluid communication with the inlet of cyclone separator 18. Passageway 16 provides the gasiform material with a means for rapid transfer from the radial extending passageway to the cyclone separator. Cyclone separator 18 is conventionally provided with dipleg 20 to return separated solid catalyst particles to the body of catalyst in the lower portion of vessel 4. Vapor outlet 22 conducts the separated vapor directly to plenum chamber 24 for removal from vessel 4 through line 26 for passage to product fractionation equipment, not shown. Stripping steam together with the hydrocarbons stripped from the catalyst flows from the top of stripping vessel 12 and passes to the upper portion of vessel 4 into cyclone 28 which is in open communication with the interior of vessel 4. Cyclone 28 is provided with dipleg 32 which delivers separated particles to the body of catalyst in the lower section of vessel 4. In a fashion similar to the use of cyclone 18, vapor outlet 30 conducts the vapors separated in cyclone 28 to plenum chamber 24 and line 26 for delivery to a fractionation unit.

When using the above apparatus, a suspension of fluidizable catalyst particles in gasiform material such as hydrocarbon vapors, is caused to flow upwardly through riser 2 and outwardly through radially extending arm 6. The top of the riser is capped and the end of the radially extending arm is terminated with an opening in the upper surface which communicates with restricted passageway 16. The lower surface of radial arm 6 is provided with an opening which is in open communication with vessel 4 and catalyst collecting and stripping vessel 12. The abrupt change in direction of the suspension from horizontal flow to vertical flow at the end of the radial arm establishes inertial forces which cause a concentration of the catalyst portion of the suspension and hence a separation from the hydrocarbon vapors. Gravity forces cause the concentrated catalyst to pass vertically and downwardly through opening 10 of radial arm 6 for discharge into the open upper end of stripping vessel 12. Some gasiform material exits from radial arm 6 along with the catalyst, moves out from under the open end of the radial arm into a lower velocity region, then into the upper portion of vessel 4 and finally into cyclone 28 for removal of any catalyst particles entrained therein. Alternatively, cyclone 28 could be omitted and an exit port for the extra gasiform material provided in conduit 16.

The flow of the suspension up through the riser and out through the radial arm constitutes several abrupt changes in direction. The inertial forces developed thereby cause the bulk of the gasiform material to be separated from the catalyst and to preferentially flow to the upper exit of radial arm 6. The vapors thus separated pass upwardly through restricted passageway 16 which provides a rapid transmission of the cracked vapors to cyclone separator 18 positioned in the upper portion of vessel 4. The principal purpose of the restricted passageway is to limit the time the cracked vapors would be exposed to elevated temperatures if they otherwise passed at lower velocity through the upper portion of vessel 4 to the cyclone separator. By providing a direct path for the vapors to be transported out of the elevated temperature zone, they may be quenched in the main fractionator of the processing unit, thereby limiting undesirable overcracking. To further reduce the exposure of these vapors to elevated temperatures, means to lower their temperature (not shown in the drawing) may be provided in restricted passageway 16. Such indirect cooling means, as steam or water coils, or such direct cooling means as injecting liquid or gaseous quench may be provided. These techniques are well known to those skilled in the art and need not be further described herein.

Cyclone separating means 18 and 28 may be located in the upper portion of vessel 4 or external thereto. They may be single or multiple stage and may comprise sequentially arranged units, as required. Cyclone separator means 18 communicates directly with each of the radial extending arms provided to handle the bulk of the separated vapors while the other separator 28 is in open communication with the interior of the upper portion of vessel 4 to handle the vapors which exit through the open end of each radial arm as well as the hydrocarbons stripped from the catalyst in the steam strippers and the steam vapors which have done the stripping. Both cyclone separators are provided with diplegs (20 and 32) to return the entrained catalyst to the body of stripped catalyst. The catalyst is removed through conduit 34 for passage to a separate vessel for regeneration by conventional means, not shown. The separated gasiform material is removed from each cyclone by vapor outlets 22 and 30 through plenum chamber 24 and passed to a fractionation unit (not shown) by conduit 26.

Figures 2, 3:
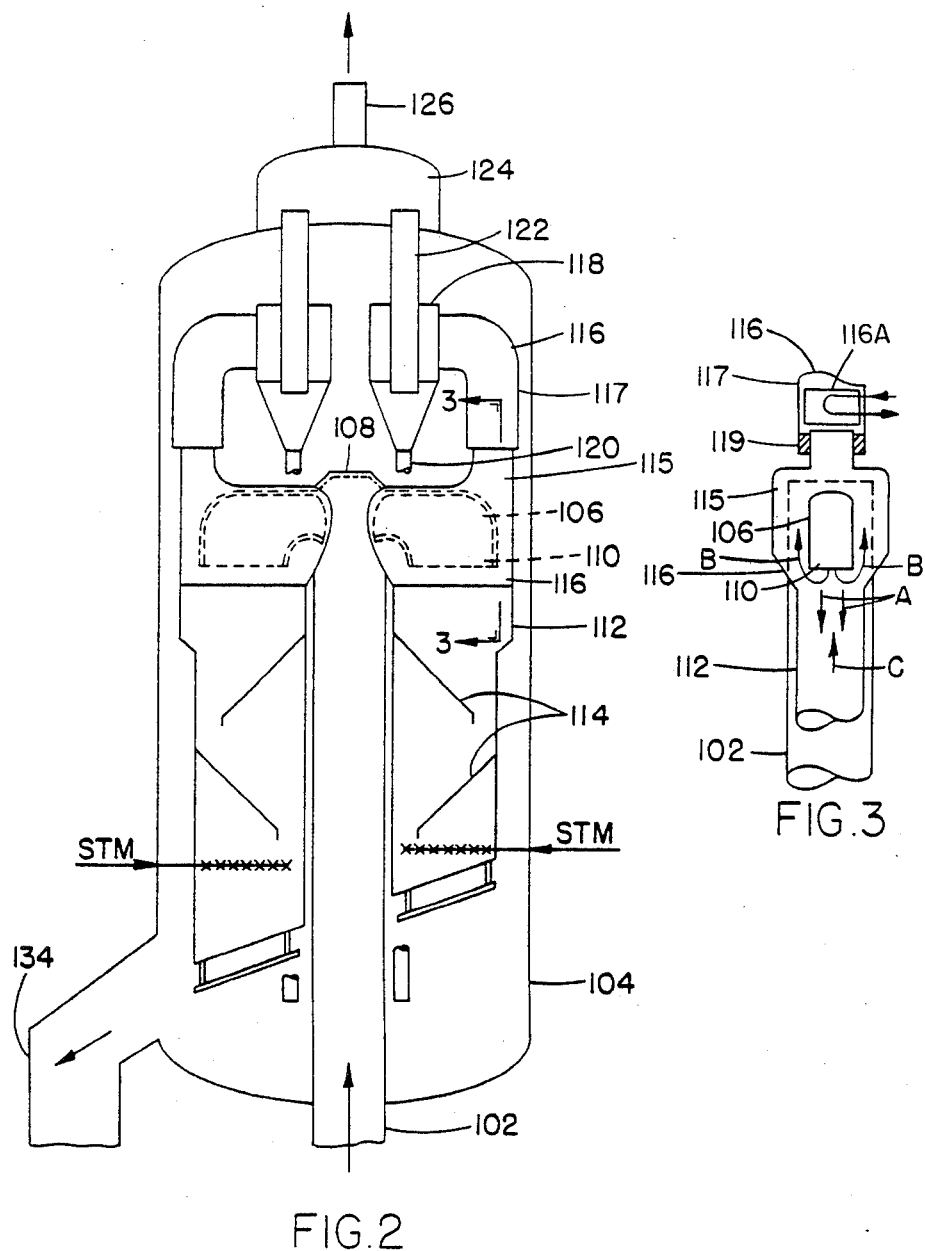
FIG. 2 is a drawing of another embodiment of the invention.
FIG. 3 is a section drawing along line 3—3 of a portion of FIG. 2.

Another embodiment of this invention, which is particularly preferred, is shown diagrammatically in FIGS. 2 and 3 which present another arrangement of apparatus for effecting separation of a suspension discharged from a riser conversion zone into a disengaging vessel. Where the same or substantially the same components appearing in FIG. 1 also appears in FIG. 2 or 3, the components in FIG. 2 or 3 will be identified by the number employed in FIG. 1 plus 100, viz., 2 in FIG. 1 becomes 102 in FIGS. 2 and 3, 12 becomes 112, etc.

Referring to FIGS. 2 and 3, there is shown the upper end of riser hydrocarbon conversion zone 102 extending upwardly into disengaging vessel 104. The riser terminates in an upper intermediate portion of vessel 104 with a horizontal cross member arm referred to as radial extending restricted passageway 106. For illustrative purposes, two radial extending restricted passageways are shown but those skilled in the art will appreciate that normally 3, 4 or more of these radial passageways extending generally horizontally outwardly from the upper capped end 108 of riser 102 will be provided as the need dictates. In the following description only one of the radial extending restricted passageways and its attendant apparatus will be discussed. It is to be understood that the other separation apparatus illustrated as well as any additional ones will function in the same manner.

The lower portion of radial passageway 106 is provided with an opening and is in open communication with the vapor disengaging space therebelow. Positioned below opening 110 is catalyst collecting and stripping vessel 112 provided with a plurality of downward sloping baffles 114 to allow stripping steam, which enters at the lower end of vessel 112, to intimately contact downwardly cascading catalyst. Vessel 112 has an upper open end enlarged to provide a funnel shaped collecting zone for the catalyst discharged from radial passageway 106. The bottom end of vessel 112 is also open-ended to permit the stripped catalyst to pass to the body of stripped catalyst collected in the lower end of vessel 104.

The open lower portion 110 of radial passageway 106 is in open communication with restricted passageway 116 which in turn is in direct fluid communication with the inlet of cyclone separator 118 and stripping vessel 112. Restricted passageway 116 consists of a lower portion 115 and an upper portion 117, both portions being connected by packed slip joint 119 which compensates for thermal expansion. Restricted passageway 116 is completely enclosed to provide a path directly from open end 110 and stripping vessel 112 to cyclone 118. Therefore, passageway 116 completely surrounds and contains radial extending restricted passageway 106 in spaced relationship thereto and is connected to the top of stripping vessel 112 and the inlet to cyclone 118. Passageway 116 provides a means for rapid transfer of the gasiform material exiting radial passageway 106 and the stripping steam and stripped hydrocarbons leaving the top of stripping vessel 112 directly to cyclone separator 118. Cyclone separator 118 is conventionally provided with dipleg 120 to return separated solid catalyst particles to the body of catalyst in the lower portion of vessel 104. Vapor outlet 122 conducts the separated vapor directly to plenum chamber 124 for removal from vessel 104 through line 126 for passage to product fractionation equipment, not shown.

When using the above apparatus, a suspension of fluidizable catalyst particles in gasiform material such as hydrocarbon vapors, is caused to flow upwardly through riser 102 and outwardly through radially extending arm 106. The top of the riser is capped and the end of the radially extending arm is terminated in opening 110 disposed in a downward direction. This opening is in open communication with stripper vessel 114. The abrupt change in direction of the suspension from vertical flow to horizontal flow and then to a downward pattern by the internal curved surface of the radial passageway establishes centrifugal forces which cause a concentration of the catalyst portion of the suspension and hence a separation from the hydrocarbon vapors. Referring in particular to FIG. 3, the concentrated catalyst passes along the curved surface of the radial passageway for discharge downwardly from opening 110 into the open upper end of stripping vessel 112, as illustrated by arrows A in FIG. 3. The gasiform part of the suspension comprising hydrocarbon vapors thus centrifugally separated from entrained catalyst particles in the disengaging space provided between opening 110 of passageway 106 and vessel 112 moves out from under radial extending restricted passageway into restricted passageway 116, as illustrated by arrows B, where they are joined by stripped hydrocarbons and stripping steam leaving the top of stripping vessel 112, as illustrated by arrow C. These combined vapors pass upwardly through restricted passageway 116 which provides a rapid transmission of the cracked vapors to cyclone separator 118 positioned in the upper portion of vessel 104. The principal purpose of restricted passageway 116 is to limit the time the cracked vapors would be exposed to elevated temperatures if they otherwise passed randomly and at lower velocity through the upper portion of vessel 104 to the cyclone separator. By providing a direct path for the vapors to be transported out of the elevated temperature zone, they may be quenched in the main fractionator of the processing unit, thereby limiting undersirable overcracking. To further reduce the exposure of these vapors to elevated temperatures, means to lower their temperature 116A may be provided in restricted passageway 116. Such indirect cooling means, as steam or water coils, or such direct cooling means as injecting liquid or gaseous quench may be provided. These techniques are well known to those skilled in the art and need not be further described herein.

Cyclone separating means 118 may be located in the upper portion of vessel 104 or external thereto and may be single or multiple stage or may comprise sequentially arranged units, as required. The cyclone separator means communicates directly with each of the radial extending arms and the stripping vessels to handle the separated vapors as well as the hydrocarbons stripped from the catalyst in the steam strippers and the steam vapors which have done the stripping. Cyclone separator 118 is provided with dipleg 120 to return the entrained catalyst to the body of stripped catalyst. The catalyst is removed through conduit 134 for passage to a separate vessel for regeneration by conventional means, not shown. The separated gasiform material is removed from the cyclone by vapor outlet 122 through plenum chamber 124 and passed to a fractionation unit (not shown) by conduit 126.

In the practice of this invention, the separation of catalyst from gasiform materials is achieved efficiently while concomitantly minimizing the length of time that the gasiform materials are subjected to reaction temperature after separation from the catalyst. The suspension separation arrangement arrangement and the restricted passageway provided at the riser outlet contribute in substantial measure to achieving the results as expressed above. Thus it is contemplated employing two or more radially extending restricted passageways, such as three or four, equally spaced apart and extending from the upper end of the riser. The catalyst stripper may be an annular chamber when several radial arms or passageways are employed or a separate chamber associated with each radial passageway. Similarly, the restricted passageway between the end of a radially extending restricted passageway and the inlet to the cyclone may comprise a separate conduit for each radial passageway or a header joining each radial passageway with a single large conduit connecting the vapor header to the cyclone.

What is claimed is:

1. In a process for the fluid catalytic cracking of mineral oil whereby the mineral oil is catalytically cracked by passing a suspension of mineral oil and catalyst through a riser conversion zone under cracking conditions into a disengaging vessel and the catalyst recovered from said riser conversion zone is thereafter regenerated to remove carbonaceous deposits before return of the regenerated catalyst to said riser conversion zone and whereby the mineral oil-catalyst suspension is separated upon discharge from the riser conversion zone by (a) discharging the suspension outwardly through an opening in the upper periphery of the riser and through a radially extending restricted passageway having an opening in the bottom side thereof whereby a substantially confined catalyst stream discharges in a downward direction generally separate from the cracked mineral oil vapors, said restricted passageway curved downwardly adjacent the outer end thereof to induce a downward movement on said confined catalyst stream in said passageway sufficient to direct said stream downwardly into the open upper end of a catalyst stripping passageway positioned beneath said outer end to maintain catalyst so collected and directed separate from said discharged cracked mineral oil vapors and (b) passing the cracking mineral oil vapors through the disengaging vessel to the upper portion thereof and into the entrance of a cyclone separation means, the improvement which comprises: discharging the cracked mineral oil vapors from the outer extremity of the radially extending restricted passageway to a vertically disposed elongated restricted passageway in fluid communication with the inlet of a first cyclone separation means whereby the cracked mineral oil vapors are directed from the outer extremity of the radially extending restricted passageway into the first cyclone separation means.

2. A process according to claim 1 wherein the suspension of the cracked mineral oil vapors and the catalyst are discharged in a downward direction from the radially extending restricted passageway, whereby the catalyst passes to the catalyst stripping passageway and the cracked mineral oil vapors are combined with stripped hydrocarbons and stripping steam from the catalyst stripping passageway and pass through the vertically disposed restricted passageway into the cyclone separation means, said vertically disposed restricted passageway surrounding and containing the radially extending restricted passageway in spaced relationship thereto and in direct fluid communication with the upper end of the catalyst stripping passageway.

3. A process according to claim 1 wherein the catalyst and a minor portion of the cracked mineral oil vapors are discharged in a downward direction into the interior of the disengaging vessel and the remaining cracked mineral oil vapors are discharged in an upward direction into the vertically disposed restricted passageway, whereby, the catalyst passes into the catalyst stripping passageway, the minor portion is combined with stripped hydrocarbons and stripping steam from the catalyst stripping passageway to form a vaporous admixture, the vaporous admixture passes through the interior of the disengaging vessel and into a second cyclone separation means, and the remaining cracked mineral oil vapors pass through the vertically disposed restricted passageway into the first cyclone separation means, the lower end of the vertically disposed restricted passageway being in fluid communication with the outer extremity of the radially extending restricted passageway.

4. A process according to claim 1 wherein the cracked mineral oil vapors are cooled in the vertically disposed restricted passageway to a temperature below about 1000° F.

5. A process according to claim 4 wherein the cooling is effected by indirect heat exchange.

6. A process according to claim 4 wherein the cooling is effected by liquid or gaseous quench.

7. A process according to claim 2 wherein the cracked mineral oil vapors pass from the first cyclone separation means through a vapor conduit to a fractionation means.

8. A process according to claim 3 wherein the remaining cracked mineral oil vapors pass from the first cyclone separation means through a vapor conduit to a fractionation means and the vaporous admixture passes from the second cyclone separation means through a vapor conduit to a fractionation means.

9. An apparatus for separation of catalyst particles from gasiform material which comprises:

(a) a disengaging vessel serving as a reservoir for collected catalyst particles, (b) a vertically disposed elongated tubular conduit having an upstream end and a downstream end, the latter terminating within said vessel, (c) a radially extending restricted passageway having an inlet communicating with said elongated tubular conduit at said downstream end and an opening along the bottom of said radially extending restricted passageway, said bottom opening adapted to discharge catalyst particles in a downward direction as a substantially confined catalyst stream, (d) a first cyclone separation means adapted to separate entrained catalyst from gasiform material, to discharge separated catalyst into said disengaging vessel and to discharge said gasiform material external to said disengaging vessel, (e) a vertically disposed catalyst stripping passageway positioned below and in open communication with the bottom opening of the radially extending restricted passageway and adapted to receive the substantially confined catalyst stream into its upper end, and (f) a vertically disposed elongated restricted passageway in direct fluid communication with the upper end of the catalyst stripping passageway and the inlet of the first cyclone separation means and in open fluid communication with the bottom opening of the radially extending restricted passageway, said vertically disposed restricted passageway surrounding and containing said radially extending restricted passageway in spaced relationship thereto.

10. An apparatus according to claim 9 wherein the vertically disposed restricted passageway additionally contains a cooling means.

11. An apparatus according to claim 10 wherein the cooling means is an indirect heat exchange means.

12. An apparatus according to claim 10 wherein the cooling means is a direct heat exchange means.

13. An apparatus for separation of catalyst particles from gasiform material which comprises:
   (a) a disengaging vessel serving as a reservoir for collected catalyst particles,
   (b) a vertically disposed elongated tubular conduit having an upstream end and a downstream end, the latter terminating within said vessel,
   (c) a radially extending restricted passageway having an inlet communicating with said elongated tubular conduit at said downstream end and an opening along the bottom of said radially extending restricted passageway and an opening on the top of the downstream extremity of said radially extending restricted passageway, said bottom opening adapted to discharge catalyst particles in a downward direction as a substantially confined catalyst stream into the interior of said disengaging vessel,
   (d) a first cyclone separation means adapted to separate entrained catalyst from gasiform material, to discharge separated catalyst into said disengaging vessel and to discharge said gasiform material external to said disengaging vessel, and
   (e) a vertically disposed elongated restricted passageway communicating with the top opening of said downstream extremity of the radially extending restricted passageway and the inlet of said first cyclone separation means.

14. An apparatus according to claim 13 wherein the vertically disposed restricted passageway additionally contains a cooling means.

15. An apparatus according to claim 14 wherein the cooling means is an indirect heat exchange means.

16. An apparatus according to claim 14 wherein the cooling means is a direct heat exchange means.

17. An apparatus according to claim 13 including the following apparatus:
   a second cyclone separation means having an inlet communicating with the interior of said disengaging vessel and a gas outlet communicating with the exterior of said disengaging vessel.

18. In a process for the fluid catalytic cracking of mineral oil whereby the mineral oil is catalytically cracked by passing a suspension of mineral oil and catalyst through a riser conversion zone under cracking conditions into a disengaging vessel and the catalyst recovered from said riser conversion zone is thereafter regenerated to remove carbonaceous deposits before return of the regenerated catalyst to said riser conversion zone and whereby the mineral oil-catalyst suspension is separated upon discharge from the riser conversion zone by
   (a) discharging the suspension outwardly through an opening in the upper periphery of the riser and through a radially extending restricted passageway having an opening in the bottom side thereof whereby a substantially confined catalyst stream discharges in a downward direction generally separate from the cracked mineral oil vapors, said restricted passageway curved downwardly adjacent the outer end thereof to induce a downward movement on said confined catalyst stream in said passageway sufficient to direct said stream downwardly into the open upper end of a catalyst stripping passageway positioned beneath said outer end to maintain catalyst so collected and directed separate from said discharged cracked mineral oil vapors and
   (b) passing the cracking mineral oil vapors through the disengaging vessel to the upper portion thereof and into the entrance of a cyclone separation means, the improvement which comprises: discharging the cracked mineral oil vapors from the outer extremity of the radially extending restricted passageway to a vertically disposed restricted passageway in fluid communication with the inlet of a first cyclone separation means whereby the cracked mineral oil vapors are directed from the outer extremity of the radially extending restricted passageway into the first cyclone separation means and cooling mineral oil vapors in the vertically disposed restricted passageway to a temperature below about 1000° F.

19. An apparatus for separation of catalyst particles from gasiform material which comprises:
   a disengaging vessel serving as a reservoir for collected catalyst particles,
   a vertically disposed elongated tubular conduit having a downstream end terminating within said vessel and an upstream end,
   a radially extending restricted passageway having an inlet communicating with said elongated tubular conduit at said donwstream end and an opening along the bottom of said radially extending restricted passageway, said bottom opening adapted to discharge catalyst particles in a downward direction as a substantially confined catalyst stream,
   first separation means adapted to separate catalyst from gasiform material, to discharge separated catalyst into said disengaging vessel and to discharge said gasiform material external to said disengaging vessel,
   a vertically disposed catalyst stripping passageway positioned below and in open communication with the bottom opening of the radially extending restricted passageway and adapted to receive the substantially confined catalyst stream into its upper end, and a vertically disposed restricted passageway containing cooling means in direct fluid communication with the upper end of the catalyst stripping passageway and the inlet of the first separation means and in open fluid communication with the bottom opening of the radially extending restricted passageway, said vertically disposed restricted passageway surrounding and containing said radially extending restricted passageway in spaced relationship thereto.

20. An apparatus according to claim 19 wherein the cooling means is an indirect heat exchange means.

21. An apparatus according to claim 10 wherein the cooling means is a direct heat exchange means.

* * * * *